United States Patent
Toksvig

(10) Patent No.: US 10,453,247 B1
(45) Date of Patent: Oct. 22, 2019

(54) VERTEX SHIFT FOR RENDERING 360 STEREOSCOPIC CONTENT

(71) Applicant: Facebook, Inc., Menlo Park, CA (US)

(72) Inventor: Michael John Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 27 days.

(21) Appl. No.: 15/945,959

(22) Filed: Apr. 5, 2018

(51) Int. Cl.
*G06T 15/20* (2011.01)
*H04N 13/383* (2018.01)
*G06T 19/00* (2011.01)
*G06T 15/00* (2011.01)

(52) U.S. Cl.
CPC ............ *G06T 15/20* (2013.01); *G06T 15/005* (2013.01); *G06T 19/003* (2013.01); *H04N 13/383* (2018.05)

(58) Field of Classification Search
None
See application file for complete search history.

*Primary Examiner* — Vu Nguyen
(74) *Attorney, Agent, or Firm* — Fenwick & West LLP

(57) ABSTRACT

A 360 video system can render 360 stereoscopic content based on a virtual environment using a standard GPU rendering pipeline. In some embodiments, in order to improve efficiency in generating 360 stereoscopic content, a vertex shift technique can be used to approximate multiple viewpoints in a single 360 stereoscopic eye view. When rendering the virtual environment, each triangle of the virtual environment can be shifted to represent the view from a viewpoint corresponding to that triangle. Using vertex shift techniques, a virtual environment can be rendered into a 360 stereoscopic eye view in one pass of a GPU rendering pipeline, according to some embodiments.

20 Claims, 7 Drawing Sheets

US 10,453,247 B1

VERTEX SHIFT FOR RENDERING 360 STEREOSCOPIC CONTENT

BACKGROUND

Virtual reality (VR) content or other 360 degree panoramic content can provide a uniquely immersive experience to a user. For example, giving a user the ability to "look around" inside a virtual environment or scene while motion or other content occurs around the user. VR or 360 degree panoramic content can be delivered as a fully rendered virtual environment, rendered in real time. For example, a virtual environment rendered in real time can allow a user free motion within the virtual environment, or may otherwise render the virtual environment in response to the actions of the user. However, detailed virtual environments require a high end client device to effectively render the virtual environment for VR in realtime. For example, an expensive high end PC or modern gaming console may be required to render a virtual environment for realtime VR. To allow a VR experience inside a virtual environment with less processing requirement for the client device, for example, to allow consumption of VR content on a phone or budget client device, virtual environments can be pre-rendered as 360 stereoscopic content. Using pre-rendered 360 stereoscopic content allows much of the processing overhead of rendering a virtual environment for VR to be offloaded, either to a separate 360 video system (which can then serve the 360 stereoscopic content to a client device) or to allow the client device to pre-render the 360 stereoscopic content.

As used herein, 360 stereoscopic content comprises 360 video content rendered from a virtual environment. In some implementations, a frame of 360 stereoscopic content comprises two eye views, one for each of a user's eyes. Each individual eye view is a 360 degree image generated to approximate the view from the associated eye through any orientation of the user's head. Depending on the user's head orientation, a client device can display the correct portions of each eye view to the associated eye, approximating the correct view of the virtual environment from the 360 stereoscopic content. However, playback of 360 stereoscopic content does not require rendering of the full virtual environment, but instead only the interpretation and display of the 360 video content contained within the 360 stereoscopic content.

Using stereoscopic 360 content requires a 360 video system, which can be the client device or a specialized server, to render eye views for each frame of the 360 stereoscopic content. However, rendering large volumes of 360 stereoscopic content using a traditional GPU rendering pipeline can be time consuming and inefficient compared to rendering standard 360 (non-stereoscopic) content. In some cases, common Graphic Processing Unit (GPU) based rendering techniques are inefficient at rendering eye views for 360 stereoscopic content, in some cases because of inbuilt limitations in standard GPU rendering pipelines. For example, commonly used GPU rendering pipelines and techniques are traditionally designed to render frames for display on a flat screen (such as a computer monitor or TV). Consequently, common GPU rendering pipelines are not specifically designed or optimized to render eye views for 360 stereoscopic content. In some cases, the volume of eye views needed to generate 360 stereoscopic content makes operation of a 360 video system inefficient and expensive. Therefore, improved techniques for rendering 360 stereoscopic content are required.

SUMMARY

A 360 video system can render 360 stereoscopic content based on a virtual environment using a standard GPU rendering pipeline. In some embodiments, rendering eye views for 360 stereoscopic content using the same GPU rendering pipeline as a monoscopic 360 image is inefficient, as standard GPU rendering techniques are designed to render an image from a single viewpoint at a time, and do not support rendering a single image based on multiple viewpoints (for example, moving the viewpoint while rendering or setting multiple viewpoint for sections of an image). However, to improve efficiency when rendering 360 stereoscopic content, a 360 video system can use "vertex shifting" techniques (as described herein) to allow an eye view for a 360 stereoscopic content to be rendered in one pass of a GPU rendering pipeline. For example, vertex shifting techniques can be implemented in a specialized vertex shader within the GPU rendering pipeline.

DETAILED DESCRIPTION

360 Video System Overview

Figure 1:
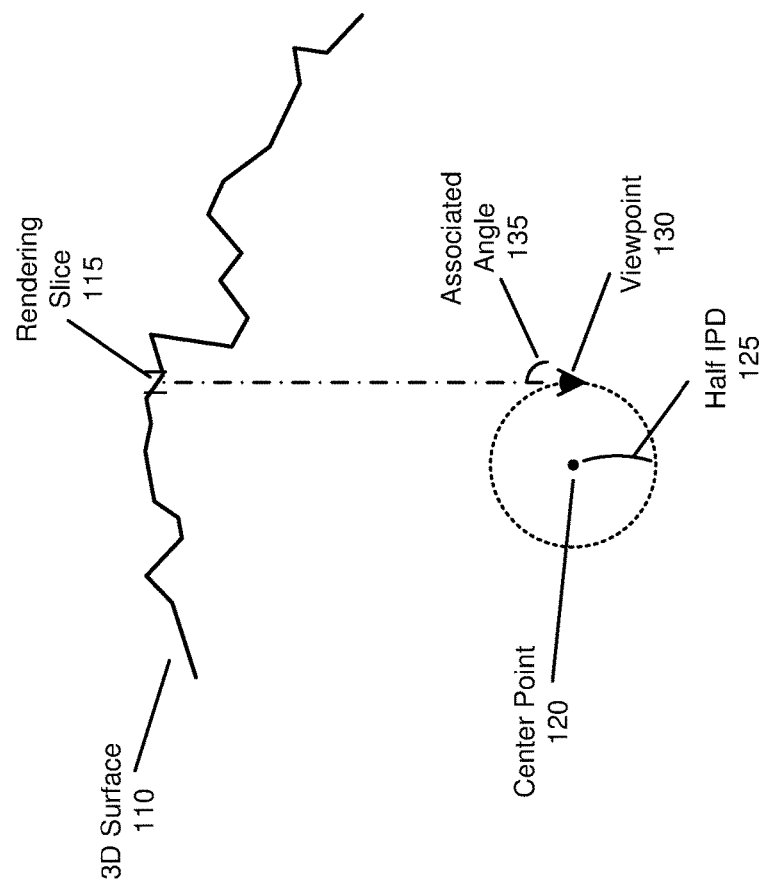
FIG. 1 illustrates an example virtual environment being rendered for 360 stereoscopic content, according to one embodiment.

In some implementations, each eye view for a frame of 360 stereoscopic content can comprise images from multiple viewpoints combined together to form the eye view. In contrast to the multiple viewpoints in a stereoscopic 360 eye view, a single viewpoint can be used to render a monoscopic 360 image, making rendering 360 stereoscopic content more complex than an equivalent monoscopic 360 image. Standard GPU rendering pipelines are designed to efficiently render a virtual environment from a single viewpoint and are therefore suited to rendering monoscopic 360 images. For example, standard GPU rendering techniques are commonly used to render frames for an animated movie or videogame, where each frame is rendered from a single viewpoint for display on a screen.

In some embodiments, each frame of stereoscopic 360 content includes two "eye views," 360 images each representing the view from one of a user's eye as the user's head turns 360 degrees. In some implementations, each eye view for 360 stereoscopic content represents the view from a user's eye as the user's head rotates 360 degrees. As a user's head rotates in a circle around a given point, each of the user's eye moves in space (for example, in a circle) as the head turns. That is, because an eye view represents the view from an eye as the head turns, each eye view for stereoscopic 360 content is not a standard monoscopic 360 image (rendered from a single viewpoint), but can instead incorporate image information from many different viewpoints to approximate the view from a user's eye as the user's head rotates in space. Therefore, rendering eye views for 360 stereoscopic content using the same GPU rendering pipeline as a monoscopic 360 image is inefficient, as standard GPU rendering techniques are designed to render an image from a single viewpoint at a time, and do not support rendering a single image based on multiple viewpoints (for example, moving the viewpoint while rendering or setting multiple viewpoint for sections of an image). Therefore, rendering a 360 stereoscopic eye view using an unmodified GPU rendering pipeline often involves rendering each eye view in many slices over many passes through the GPU pipeline, where each slice corresponds to a section of the eye view rendered from a certain viewpoint. The rendered slices can be composited to generate the final 360 stereoscopic eye view.

However, a 360 video system can use "vertex shifting" techniques as described herein to allow an eye view for a 360 stereoscopic content to be rendered in one pass of a GPU rendering pipeline, greatly improving the efficiency of rendering 360 stereoscopic content by reducing the amount of passes through the GPU rendering pipeline (and the associated overhead) needed to render eye views comprising multiple viewpoints.

FIG. 1 illustrates an example virtual environment being rendered for 360 stereoscopic content, according to one embodiment. The virtual environment 100 comprises a 3D surface 110 including a plurality of rendering slices, for example the rendering slice 115. In some embodiments, the virtual environment 100 includes a plurality of 3D surfaces representing objects within the virtual environment 100 or other suitable parts of the virtual environment 100. A 3D surface 110 can be a 3D mesh, 3D model, or any other suitable 3D representation of an object or part of an environment.

Each 3D surface 110 in the virtual environment 100 is made up of a plurality of rendering slices 115 which contain positional and/or shape information to allow the 3D surface 110 to be rendered. Each rendering slice 115 can be a unit of the virtual environment 100 which can be individually rendered by a 360 video system. Similarly, rendering slices 115 can contain other relevant information for rendering that portion of the 3D surface 110, such as texture, color, transparency, or material information about the rendering slice 115. For example, each rendering slice 115 can be a vertex, group of vertices, triangle ("tri"), quad, polygon, or any other suitable structure. In some implementations, the 3D surface 110 can be rendered (for example, in the process of rendering the virtual environment 100) by calculating the position and visibility of each rendering slice 115 of the 3D surface 110 from the perspective/viewpoint to be rendered. In some implementations, vertex shifting techniques can be used to efficiently generate 360 stereoscopic content for virtual environments 100 using any suitable type of rendering slice 115.

In the embodiment of FIG. 1, the virtual environment 100 is being rendered as an eye view for 360 stereoscopic content. In this embodiment the virtual environment 100 is being rendered as a right eye view, and similar techniques can be applied to generate the corresponding left eye view. For 360 stereoscopic content, the virtual environment 100 can be rendered based on a center point 120, simulating the center of a user's head, and each eye view (left and right) is rendered from a series of viewpoints 130 to approximate the view from an eye of the user as the user's head rotates around the center point 120. To generate a stereoscopic 3D effect for 360 stereoscopic content, the viewpoint 130 for the right eye view and the corresponding viewpoint for the left eye view are separated by an interpupillary distance (IPD) approximating the distance between a user's eyes. Therefore, the distance between the center point 120 and each viewpoint 130 is the half IPD 125. In some embodiments, the IPD is constant across an eye view, however in other implementations, the IPD within an eye view can be variable, depending on the elevation angle of a user's view or any other suitable factor. For example, the IPD can have an inverse relationship with the angle of elevation as the angle of elevation deviates from level, producing 360 stereoscopic content with full IPD in the center of the image and zero IPD (a mono image) when looking directly up or down. In some embodiments, this IPD reduction when looking directly up or down prevents artifacts or other undesirable effects if a user were to look directly up or down and spin in place.

In order to render a 360 stereoscopic eye view, each rendering slice 115 of the virtual environment 100 can be rendered as viewed from a specific viewpoint (where the collection of all the rendered rendering slices 115 forms the 360 stereoscopic eye view). In some implementations, the viewpoint associated with each rendering slice 115 corresponds to the user's eye position when looking directly at the rendering slice 115. For example, in the embodiment of FIG. 1, the rendering slice 115 is associated with the viewpoint 130. In some implementations, rendered 360 stereoscopic content contains limited information about the virtual environment 100. That is, in some cases each frame of 360 stereoscopic content is a 360 image and therefore doesn't include all the 3D information of the virtual environment 100 required to display a completely accurate representation of the virtual environment for all possible viewpoints the frame of 360 stereoscopic content is viewable from. Therefore, to generate the best approximation of the virtual environment 100, a 360 video system can assume that a user is looking directly at each rendering slice 115 from the associated viewpoint 130 when the rendering slice 115 is rendered, according to some embodiments. In this case, the associated angle 135 between the viewpoint 130 and the rendering slice is 0. The viewpoint 130 associated with each rendering slice 115 can be determined, for example, by finding the tangent line between the rendering slice and a circle with a half IPD radius 125. In implementations using variable IPD, similar techniques (described below) can be used to find the viewpoint 130 associated with a given rendering slice 115.

Figure 2:
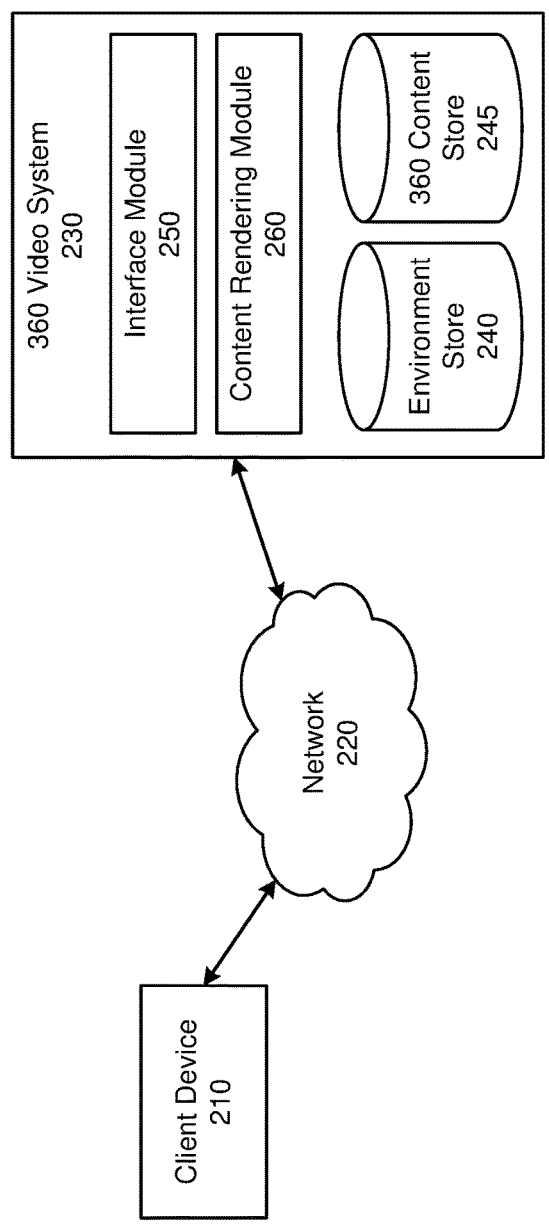
FIG. 2 is a block diagram illustrating an example computing environment in which a 360 video system operates, according to one embodiment.

FIG. 2 is a block diagram illustrating an example computing environment in which a 360 video system operates, according to one embodiment. The environment 200 of FIG. 2 comprises a client device 210, network 220, and 360 video system 230.

The client device 210, according to some embodiments, is a computing device capable of requesting and receiving 360 stereoscopic contents from the 360 video system 230. In the environment of FIG. 2, one client device 210 is shown, but in some embodiments, many client devices 210 are connected to the 360 video system 230. In some implementations, a client device 210 is a user device capable of playing back received 360 stereoscopic content to a user, such as through a VR headset or other suitable display method. In other embodiments, the client device 210 is a server which can request and store 360 stereoscopic contents for later delivery to user devices. For example, a client device 210 can be a personal computer, tablet, laptop, smartphone, server, or other suitable computing device. Client devices 210 can be can be communicatively connected to the 360 video system 230 through the network 220. However, in some embodiments the client device 210 can be integrated into the 360 video system 230, for example allowing a user to request a 360 stereoscopic content be generated by interacting with the 360 video system.

The network 220 can be any suitable network or communication method for connecting one or more client devices 210 to the 360 video system 230. For example, the network 220 can be any suitable wired or wireless network, such as a local area network (LAN), wide area network (WAN), the Internet, a cellular data network (for example, using 3G or 4G LTE technologies), or any other suitable network or communication technology.

In some embodiments, the 360 video system 230 is a computing device capable of rendering 360 stereoscopic content based on a virtual environment. For example, the 360 video system can be a server, server cluster, pc, laptop, workstation, or other suitable computing device. In some embodiments, the 360 video system includes a GPU (or multiple GPUs) and utilizes a GPU rendering pipeline to render the 360 stereoscopic content. In the environment 200, the 360 video system 230 comprises an environment store 240, a 360 content store 245, an interface module 250, and a content rendering module 260.

According to some embodiments, the environment store 240 stores one or more virtual environments 100 from which 360 stereoscopic content can be rendered. For example, a virtual environment 100 can be stored as a 3D model, or collection of 3D models in any suitable format. Virtual environments can contain scripted or physics-based motion or animation, and may include background audio or other sound effects. In some implementations, the 360 video system can retrieve virtual environments from the environment store 240 to render 360 stereoscopic content. In some embodiments, a virtual environment 100 contains one or more camera paths or positions for rendering 360 stereoscopic content.

The 360 content store 245 can store rendered 360 stereoscopic content. In some implementations, the stored 360 video content is later delivered to one or more client devices 210. 360 stereoscopic content can be stored in any suitable video file format or codec, for example MPEG-4, WMV, AVI, H.264, or any other suitable format. In some implementations, 360 stereoscopic content is stored as a single video file, with half of each frame of the stored video file storing the left eye view and the other half of the frame storing the right eye view (for example, where the upper half of the frame stores the left eye view and the lower half stores the right eye view). In other embodiments, the left and right eye views for 360 stereoscopic content are stored in a separate video channel or in a separate video file.

The interface module 250 can allow the 360 video system 230 to communicate with the client devices 210, for example, over the network 220. In some implementations, the interface module 250 receives requests to generate 360 stereoscopic content from a client device 210. A request for 360 stereoscopic content can include an identifier of the virtual environment to use if the virtual environment is already stored at the 360 video system (or the virtual environment itself), an indication of what camera path or position to use when rendering the 360 stereoscopic content, and information about the desired 360 stereoscopic content, such as a desired format and resolution for a 360 stereoscopic video. In turn, the interface module 250 can request that the content rendering module 260 generate the requested 360 stereoscopic content and subsequently send the rendered content to the requesting client device 210. In addition, the interface module 250 may receive virtual environments to store for later rendering, or requests for 360 stereoscopic content already stored in the 360 content store 245.

The content rendering module 260 can render 360 stereoscopic content based on a virtual environment and a camera path or position. In some embodiments, the content rendering module 260 uses a GPU rendering pipeline to render eye views for 360 stereoscopic content. To improve the efficiency of rendering eye views 360 stereoscopic content, the content rendering module 260 can use vertex shifting to render each eye view in a single pass. Vertex shifting can alter the positions of vertexes within the virtual environment being rendered to allow an eye view rendered from a single viewpoint (based on limitations in the GPU rendering pipeline) to approximate an eye view rendered from a plurality of viewpoints (e.g., to represent the actual change in position of an eye when as a user turns). Accordingly, multiple viewpoints can be reflected in the shifted vertexes, while still allowing the virtual environment to be processed in a single pass from a single render viewpoint.

GPU Rendering Pipeline

Figure 3:
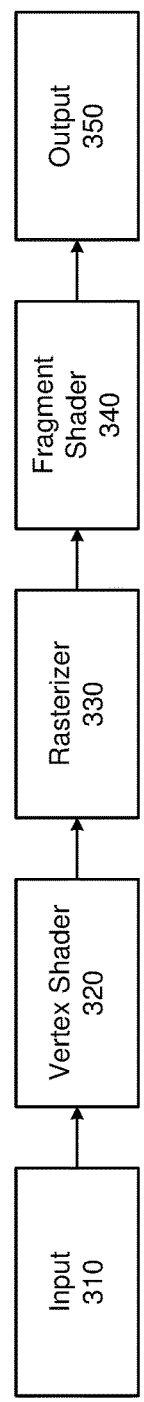
FIG. 3 is a block diagram illustrating an example rendering pipeline for rendering 3D content, according to one embodiment.

FIG. 3 is a block diagram illustrating an example rendering pipeline for rendering 3D content using a GPU, according to one embodiment. Each pass through the GPU rendering pipeline can result in an output of one image, for example a frame of a movie or 3D video game, a partial eye view for 360 stereoscopic content, or a full eye view for 360 stereoscopic content rendered using vertex shifting techniques. The GPU rendering pipeline 300 comprises an input 310, vertex shader 320, rasterizer 330, fragment shader 340, and output 350.

The input 310 can receive information about a virtual environment (for example, the virtual environment 100), rendering parameters defining the desired view of the virtual environment, and any other suitable information for rendering the virtual environment. For example, the input 310 can include 3D information, texture information, and lighting information describing the state of the virtual environment 100. Similarly, the input 310 can receive a virtual camera location and/or field of view describing the desired render camera for rendering the virtual environment. For example, for display on a monitor, the desired field of view for a rendered image may be 90 or 120 degrees (in the horizontal direction), whereas for a 360 monoscopic image or 360 stereoscopic eye view, the field of view may be 360 degrees.

In some embodiments, the vertex shader 320 modifies individual vertices of the virtual environment 100 prior to the desired view being rasterized. According to some implementations, an instance of the vertex shader 320 is run on each vertex of the virtual environment 100, where each instance performs modifications to the associated vertex. For example, a vertex shader can be used to transform the virtual environment into a virtual camera relative coordinate system (a camera transform), calculate appropriate lighting effects for each vertex, and generally to prepare the virtual environment 100 to be rendered. The vertex shader 320 can be specialized to render 360 stereoscopic eye views by including vertex shifting functionality to simulate the multiple viewpoints of the 360 stereoscopic eye view while enabling the eye view to be rendered from a single viewpoint (e.g., the rendering viewpoint or render camera) in one pass of the GPU rendering pipeline 300. For example, the vertex shader 320 can incorporate vertex shifting techniques to shift each vertex of the virtual environment 100 into a position simulating the correct viewpoint for that vertex.

The rasterizer 330 rasterizes the virtual environment 100 (for example, the virtual environment 100 after modification by the vertex shader 320), transforming 3D information of the virtual environment 100 into a set of fragments. In some embodiments, each fragment generated by the rasterizer 330 can represent a potential pixel in the final output image, containing, for example, color information for the pixel. In some implementations, the rasterizer 330 is hardcoded based on the architecture of the specific GPU being used and is therefore not practical to modify. For example, many rasterizers 330 are hardcoded to use a single virtual camera to rasterize all fragments in an image and do not support multiple virtual camera positions within a single rendered frame. Therefore, rasterizers 330 (and therefore standard GPU rendering pipelines 300) are not capable of rendering a virtual environment 100 from multiple viewpoints in one pass. Therefore, rendering a multi-viewpoint image (such as a 360 stereoscopic content eye view) requires multiple passes through the GPU rendering pipeline 300. However, using a vertex shader 320 with vertex shifting functionality as described herein, the virtual environment 100 can be modified (for example by shifting vertexes of the virtual environment) to simulate an image rendered from multiple viewpoints while only requiring one viewpoint and a single pass through the GPU rendering pipeline 300 to render.

In some embodiments, the fragment shader 340 modifies individual fragments prior to the fragments being converted into pixels of the output image. The fragment shader 340 can be run in multiple instances, for example running one instance per fragment. Each instance of a fragment shader 340 can operate on a single fragment in the image, and can change various parameters of the fragment, such as the color or z-depth of the fragment. For example, a fragment shader 340 can be used to implement edge-detection based effects, blur, shadows, or other suitable effects in the final image.

The output 350 of the GPU rendering pipeline is an image based on the input virtual environment 100 and rendering parameters, according to some embodiments. For example, the output 350 can return a 360 stereoscopic eye view rendered based on the virtual environment 100.

Example Vertex Shift

Figure 4:
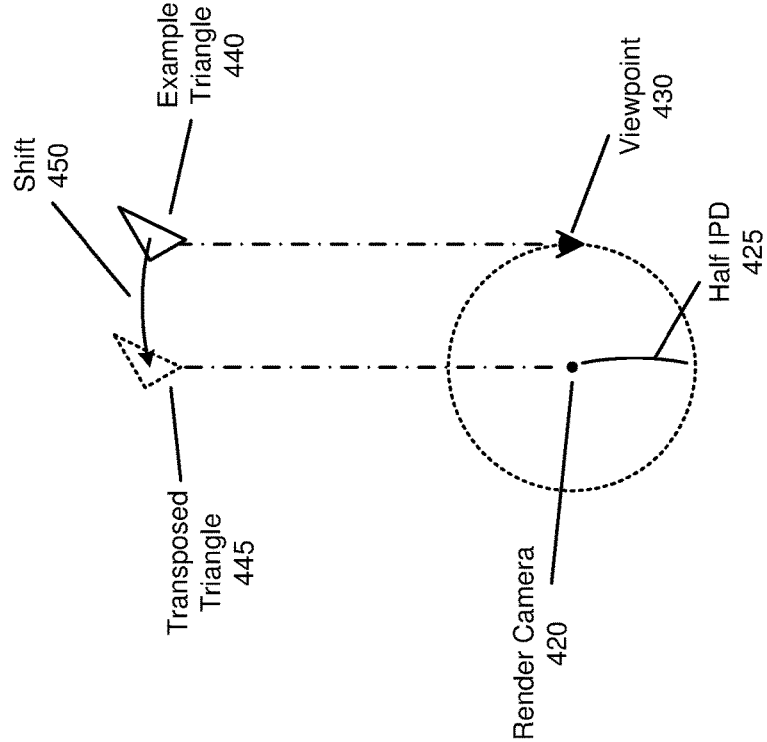
FIG. 4 illustrates an example vertex shift for approximating the view of a triangle from an alternate viewpoint, according to one embodiment.

FIG. 4 illustrates an example vertex shift for approximating the view of a triangle from an alternate viewpoint, according to one embodiment. The virtual environment 400 of FIG. 4 comprises a render camera 420, a viewpoint 430 positioned on a circle of half IPD radius 425 from the render camera 420, an example triangle 440, a transposed triangle 445, and a shift 450 between the example triangle 440 and the transposed triangle 445.

As described above, eye views for 360 stereoscopic content incorporate views of a virtual environment 100 captured from multiple viewpoints, for example to simulate the motion of a user's eye as they turn their head by using different viewpoints to render different sections of the virtual environment 100. However, standard GPU rendering pipelines, such as the GPU rendering pipeline 300, are often limited to rendering from one viewpoint for each output image, for example the render camera 420. To compensate for this, each triangle (or other suitable render slice 115) of the virtual environment 100 can be shifted to approximate the correct view for that triangle when the virtual environment 500 is rendered from the render camera 420. A triangle of the virtual environment 400 can be shifted for example, by equally shifting each vertex of the triangle or by any other suitable method. The render camera 420 is positioned at the estimated location of the user's head, such as a location equidistant between the left and right eye positions, although in other embodiments the render camera 420 can be positioned in any suitable location.

In the embodiment of FIG. 4, the example triangle 440 is associated with the viewpoint 430. To render the example triangle 440 using a GPU rendering pipeline, the example triangle 440 would be individually rendered from the associated viewpoint 430 and the resulting image would be merged with other similarly rendered images to generate the final eye view or other multi-viewpoint image. However, after being shifted, the example triangle 440 can approximate the view of the example triangle 440 from the viewpoint 430. Thus, when the virtual environment 400 is rendered from the render camera 420 the example triangle 440 will appear as if it was rendered from the viewpoint 430. Here, the shift 450 represents the shift of the example triangle 440 to the transposed triangle 445. In some embodiments, the shift 450 is calculated to maintain the same spatial relationship between the transposed triangle 445 and the render camera 420 as the unshifted example triangle 440 and the viewpoint 430. After the shift 450, when the virtual environment 100 is rendered from the render camera 420, the transposed triangle 440 can appear the same in the rendered eye view as if the example triangle 440 was rendered from the viewpoint 430, simulating an additional viewpoint for the rendered eye view.

In some embodiments, the vertex shift process is repeated for each triangle in the virtual environment 100, allowing each triangle of the virtual environment 100 to appear as though it was rendered from the correct viewpoint in the rendered eye view. In some implementations, only a subset of triangles of the virtual environment are shifted, for example to improve performance. According to some embodiments, triangles exceeding a threshold size are subdivided prior to the vertex shift techniques being used, in some cases using a geometry shader or with a preprocessing pass. Subdividing large triangles can, for example, prevent artifacts being introduced by the vertex shift technique into the rendered virtual environment.

Figure 5:
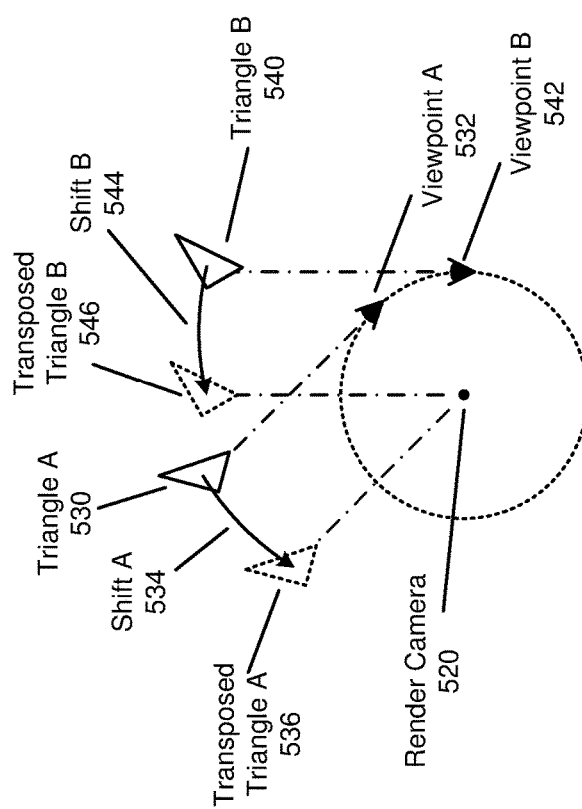
FIG. 5 illustrates shifts for a plurality of triangles for rendering a virtual environment for a 360 stereoscopic eye view, according to one embodiment.

FIG. 5 illustrates shifts for a plurality of triangles for rendering a virtual environment for a 360 stereoscopic eye view, according to one embodiment. The virtual environment 500 of FIG. 5 includes a render camera 520 and a plurality of triangles, including the triangles A 530 and B 540. Each of the triangles A 530 and B 540 have an associated viewpoint A 532 and B 540, shift amount A 534 and B 544, and corresponding transposed triangle A 536 and B 546. As described above, the triangle A 530 can be shifted 534 such that the view of the transposed triangle A 536 from the render camera 520 approximates the view of the triangle A 530 from the viewpoint A 532. Similarly, the triangle B 540 can be shifted 544 to the transposed triangle B 546 to approximate the view of the triangle B 540 from the viewpoint B 542 when the virtual environment 500 is rendered from the render camera 520. The vertex shifting process can be repeated to similarly shift each triangle in the virtual environment 500. After each triangle of the virtual environment 500 is shifted (for example, in the vertex shader 320 of the GPU rendering pipeline), rendering the virtual environment 500 from the render camera 520 results in an output eye view approximating a multi-viewpoint image generated by rendering the virtual environment 500 from the render camera 520.

The end result of the vertex shift process is to shift each triangle (or other suitable rendering slice 115) to approximate the view from the viewpoint associated with that triangle when the virtual environment 100 is rendered from a static render camera for the eye view. Therefore, when the eye view is rendered the correct viewpoint is approximated for all triangles of the virtual environment 100 shifted using vertex shifting techniques. However, the associated viewpoint and shift vector for each triangle is not initially known to the 360 video system 230 and is calculated based on known information about the relative positions of the render camera 520 and the triangle, according to some implementations.

Figure 6B:
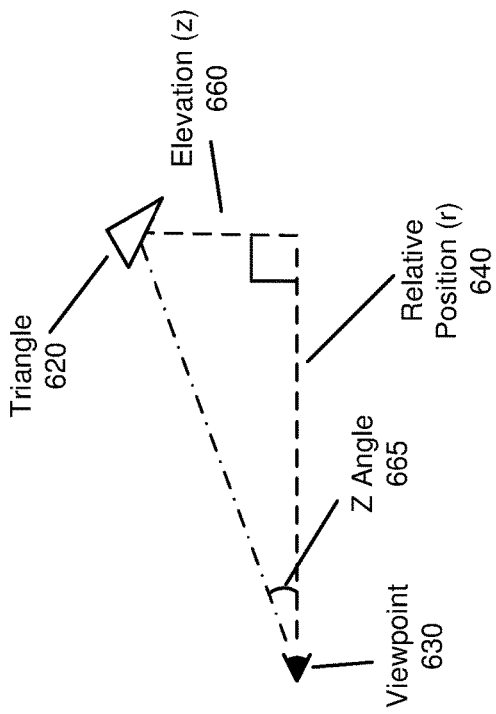
FIG. 6B illustrates an example process for determining a shift vector for a triangle using variable IPD, according to one embodiment.
Figure 6A:
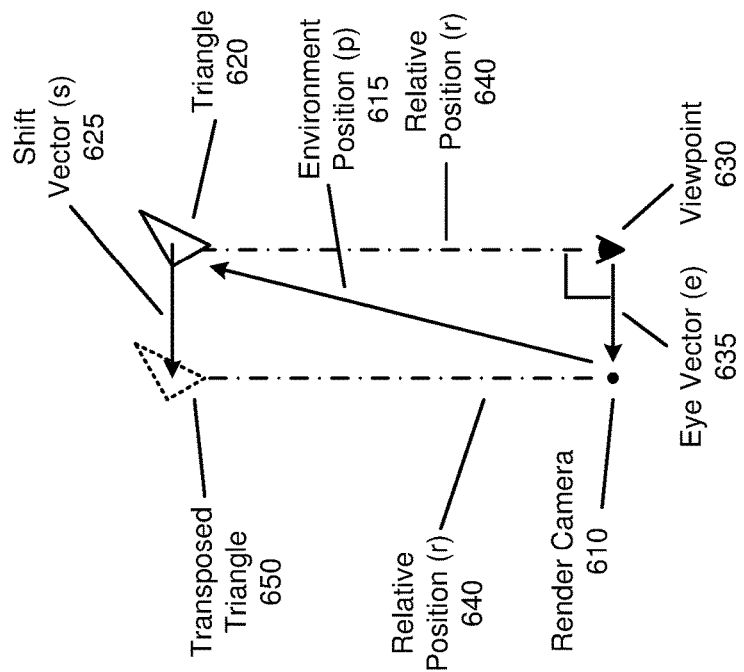
FIG. 6A illustrates an example process for determining a shift vector for a triangle based on the render point and the viewpoint associated with the triangle, according to one embodiment.

FIG. 6A illustrates an example process for determining a shift vector for a triangle based on the render camera and the viewpoint associated with the triangle, according to one embodiment. FIG. 6A shows a top-down view of the environment 600, which includes a render camera 610 and triangle 620 separated by an environment position vector (p) 615, a viewpoint 630 separated from the render camera 610 by an eye vector (e) 635 and from the triangle 620 by a relative position vector (r) 640, and a transposed triangle 650 separated from the triangle 620 by the shift vector (s) 625 and separated from the render camera 610 by an equivalent relative position vector (r) 640. FIG. 6B illustrates an example process for determining a shift vector for a triangle using variable IPD, according to one embodiment. FIG. 6B depicts the environment 600 from a side view, including the triangle 620, viewpoint 630 and relative position vector (r) 640 also depicted in FIG. 6A, as well as an elevation vector (z) and a z angle 665.

The render camera 610 represents the position of the virtual camera in the virtual environment 100 that the eye view is being rendered from. The position of the render camera 610 can be a rendering parameter received by the input 310 of the GPU rendering pipeline, and can be later used, for example by the rasterizer 330, to generate individual pixels (or fragments) for the output image or eye view. In some implementations, the render camera 610 is positioned at the approximate head position of a user viewing the virtual environment 100, between the corresponding left and right eye positions for any given head orientation of the user.

In some embodiments, the triangle 620 is a triangle or other suitable rendering slice 115 of the virtual environment 100. For example, the triangle 620 can be a triangle, vertex, group of vertexes, group of triangles, or other suitable grouping of 3D data. In some embodiments, location information about the triangle 620, such as the position and orientation of the triangle 620, is included in the virtual environment 100 and available to an instance of a vertex shader 320 running on that triangle 620 (or the vertices of the triangle 620).

The environment position vector (p) 615 represents the difference in position between the the render camera 610 and triangle 620. An environment position vector (p) 615 for a triangle 620 can be calculated based on the known positions of the triangle 620 and the render camera 610. In some embodiments, the environment position vector (p) 615 is calculated only in the xy plane (that is, ignoring the z component of the positions of the triangle 620 and render camera 610). In other implementations, the environment position vector (p) 615 can be calculated using full xyz coordinates.

In some implementations, each triangle 620 has an associated viewpoint 630, representing the approximate position of a user's eye when directly looking at the triangle 620. The viewpoint 630 can be used to render the view of the triangle 620 for inclusion in an eye view for 360 stereoscopic content. In some embodiments, eye views are rendered assuming that each eye position (and therefore viewpoint 630) has the same z-coordinate as the render camera 610. For example, because of an assumption or technical limitation that the user's head will remain level as the user turns while viewing 360 stereoscopic content.

The relative position vector (r) 640 represents the relative position between the triangle 620 and the associated viewpoint 630. In some implementations, the viewpoint 630 has a specific view of the triangle 620 based on the relative position vector (r) 640. For example, the triangle 620 will appear at a certain size and orientation when rendered from a viewpoint 630 with a specific relative position vector (r) 640. However, the triangle 620 can appear at a different size and orientation when rendered from an alternate viewpoint with a different relative position from the triangle 620. In some embodiments, the relative position vector (r) 640 is calculated only in the xy plane, similar to the environment position vector (p) 615. In other implementations, the relative position vector (r) 640 is calculated using the full xyz coordinates.

Similarly, the eye vector (e) 635 represents the difference in position between the render camera 610 and the viewpoint. In some embodiments, the eye vector (e) 635 can represent the distance between a user's eye (represented by the viewpoint 630) and the center point of the user's head (represented by the render camera 610) or the like. Therefore, the magnitude of the eye vector (e) 635 can depend on the IPD formula for the eye view. In some implementations, the IPD for an eye view is constant and the magnitude of the eye vector (e) 635 is similarly constant. However, in other embodiments the IPD is variable, for example based on the position of the triangle 620 and/or the viewpoint 630, and the magnitude of the eye vector (e) 635 can depend on the specific IPD associated with the triangle 620 and/or viewpoint 630. According to some embodiments, the eye vector (e) 635 and the relative position vector (r) 640 are orthogonal, as the relative position vector (r) 640 is assumed to be looking directly forward from the viewpoint. Therefore, the environment position vector (p) 615, eye vector (e) 635, and relative position vector (r) 640 form a right triangle, according to some embodiments.

In some embodiments, the transposed triangle 650 represents a shifted version of the triangle 620 to be rendered from the render camera 610. For example, the view of the transposed triangle 650 from the render camera 610 can approximate the view of the triangle 620 from the viewpoint 630. In some embodiments, the relative position vector (r) 640 also represents the relative position between the transposed triangle 650 and the render camera 610.

Similarly, the shift vector (s) 625 represents the shift of the triangle 620 to the position of the transposed triangle 650. In some implementations, the shift vector (s) 625 is equivalent to the eye vector (e) 635 (the difference between the viewpoint 630 and the render camera 610) in order to maintain the same relative position vector (r) 640 between the transposed triangle 650 and the render camera 610.

In some implementations, the elevation vector (z) 660 represents the elevation or difference in position on the z-axis between the viewpoint 630 and the triangle 620. For example, the elevation vector (z) 660 can be calculated by taking the z component of the relative position vector (r) 640 or environment position vector (p) 615. In some embodiments, the elevation vector (z) 660 can be used to calculate the z angle 665, which represents the corresponding angle of elevation between the viewpoint 630 and the triangle 620.

In some implementations, the vertex shader 320 for the triangle 620 initially receives the positions of the render camera 610 and the triangle 620 and rendering parameters for the eye view, for example including information about the IPD. To shift the triangle 620 to the position of the transposed triangle 650 for rendering, the shift vector (s) 625 can be determined based on the known information. Based on the positions of the render camera 610 and the triangle 620, the environment position vector (p) 615 can be determined. As described above, eye views for 360 stereoscopic content can be implemented with constant IPD or using variable IPD, such as an IPD determined based on an angle of elevation of the user's view. For simplicity, the constant IPD implementation will be discussed first. In constant IPD embodiments, the magnitude of the eye vector (e) 635 is constant value known to the vertex shader 320, for example determined by an equation of the form |e|=IPD/2.

As described above, the relative position vector (r) 640 and the eye vector (e) 635 are orthogonal and form a right triangle with the environment position vector (p) 615. Therefore, the magnitude of the relative position vector (r) 640 is known, due to the properties of right triangles, $|r|=\sqrt{|p|^2-|e|^2}$. Based on this relationship, the relative position vector (r) 640 can be written as a function of the eye vector $$(e)635 \; r = (|r|/|e|) * e^{\perp} \text{ and } r = \begin{bmatrix} r_x \\ r_y \end{bmatrix} = \begin{bmatrix} (|r|/|e|)*-e_y \\ (|r|/|e|)*e_x \end{bmatrix}.$$

The environment position vector (p) 615 can then be written as the sum of the relative position vector (r) 640 and the eye vector (e) 635, and the resulting system $$p = \begin{bmatrix} p_x \\ p_y \end{bmatrix} = \begin{bmatrix} e_x + (|r|/|e|)*-e_y \\ e_y + (|r|/|e|)*e_x \end{bmatrix}$$

can be solved for $e_x$ and $e_y$, as p, |e|, and |r| are known. As described above, the eye vector (e) 635 is equal to the shift vector (s) 625, so $$s = e = \begin{bmatrix} e_x \\ e_y \end{bmatrix}.$$

In some implementations, the vertex shader 320 can then shift the triangle 620 to the position of the transposed triangle 650 (based on the determined shift vector (s) 625).

The vertex shift process can then be repeated for each other triangle 620 in the virtual environment 100 to be shifted.

In 360 stereoscopic content implementations using variable IPD, the calculation for determining the shift vector (s) 625 for a given triangle 620 can be more complex because the magnitude of the eye vector (e) 635 (|e|) is not a known constant, such as in the fixed IPD example above, but instead a function of other parameters of the triangle 620. However, a similar process can be used to determine the shift vector (s) 625 for a triangle 620 once the magnitude of the eye vector (e) 635 (|e|) for that triangle 620 is determined.

In some embodiments using a variable IPD, the IPD is a complex function of the z angle 665 from the viewpoint 630 to the triangle 620 and can be represented as a function IPD (z angle) of the z angle 665. For example, the IPD for a given triangle 620 can have an inverse relationship with as the z angle 665, reducing from a full IPD at a z angle 665 of 0° (when a user is looking at the horizon) to an IPD of zero at a z angle of ±90° (when the user is looking straight up or down). In some implementations, the elevation (z) 660 can be determined by taking the z coordinate of the triangle 620's position, as the other vectors used to determine the shift vector (s) 625 are in the xy plane (for example, the relative position vector (r) 640. Similarly, the z angle 665 can be determined based on the magnitude of the elevation (z) 660 and relative position vector (r) 640, for example, using an equation of the form z angle=tan$^{-1}$(|z|/|r|). In implementations where the relative position vector (r) 640 is defined slightly differently, a similar relationship between the z angle, the elevation (z) 660, and the relative position vector (r) 640 can be used (for example, using an inverse sine function where the relative position vector (r) 640 includes a z component).

Therefore, the magnitude of the eye vector (e) 635 can be represented in the form $$|e| = \frac{1}{2}IPD(\tan^{-1}(|z|/|r|)),$$

where |r| and |e| are unknown. As described above, eye vector (e) 635, relative position vector (r) 640, and environment position vector (p) 615 form a right triangle, where $|r|=\sqrt{|p|^2-|e|^2}$. The resulting system of equations (of the form $$\left( \text{of the form } |e| = \frac{1}{2}IPD(\tan^{-1}(|z|/|r|)) \text{ and } |r| = \sqrt{|p|^2-|e|^2} \right)$$

can be solved numerically by any suitable method, for example using Newton-Raphson method. In some implementations, an initial guess of |r|=|p| is used, as the IPD and therefore the eye vector (e) 635 are generally relatively small compared to the relative position vector (r) 640 and environment position vector (p) 615. Therefore, an initial guess of |r|=|p| is likely to be close to the final value of |r|. For example, $|r_0|=\sqrt{|p|^2-|e_0|^2}$ can be iteratively solved using Newton-Raphson using an initial guess of $$|e_0| = \frac{1}{2}IPD(\tan^{-1}(|z|/|p|)).$$

After solving for |r| and |e|, the eye vector (e) 635 can be determined using the process used for the fixed-IPD case, for example, by solving $$\begin{bmatrix} p_x \\ p_y \end{bmatrix} = \begin{bmatrix} e_x + (|r|/|e|)*-e_y \\ e_y + (|r|/|e|)*e_x \end{bmatrix} \text{ for } e_x \text{ and } e_y.$$

Based on the determined eye vector (e) 635 the shift vector (s) 625 for the triangle 620 can be determined.

Vertex Shift Process

Figure 7:
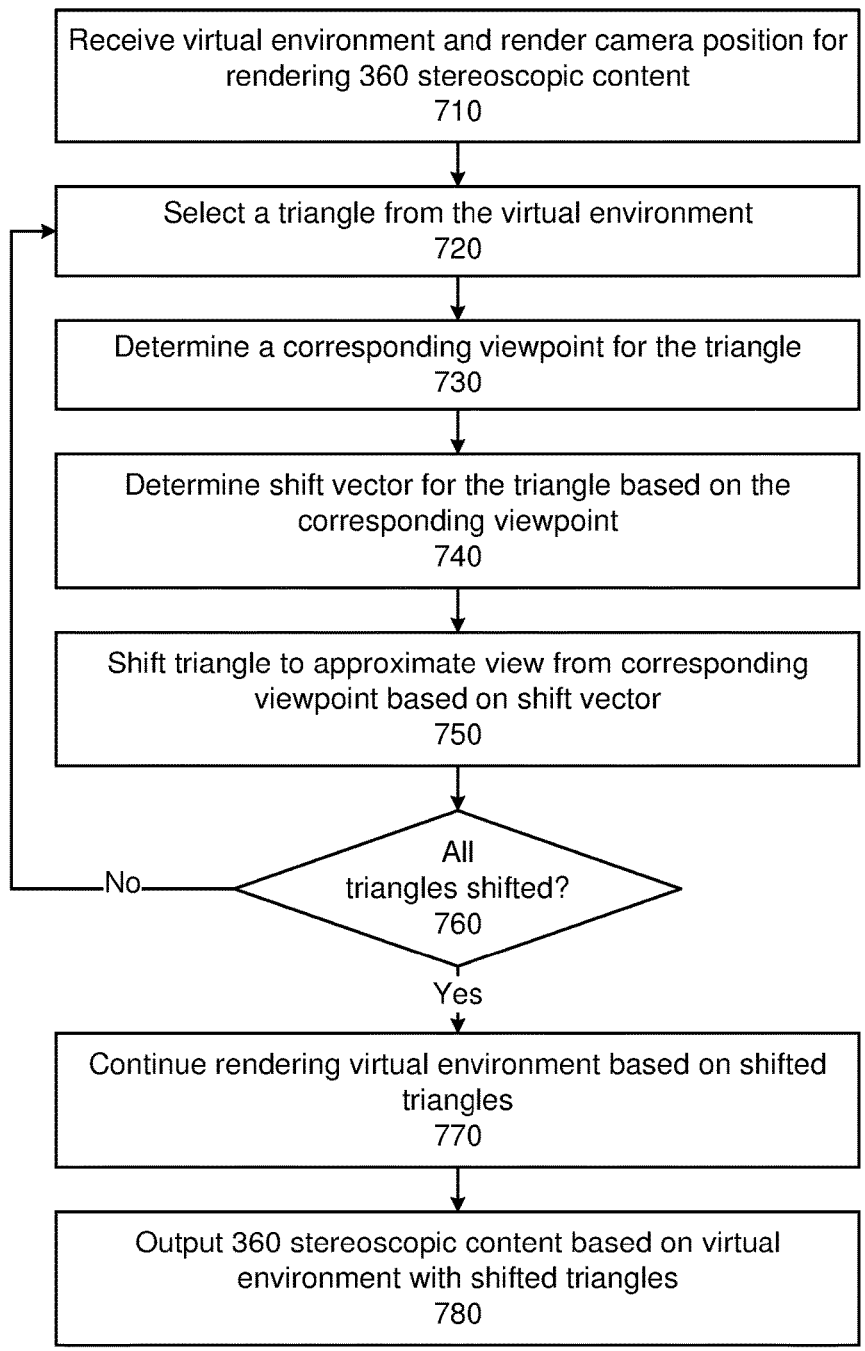
FIG. 7 is a flowchart illustrating an example process for rendering 360 stereoscopic content, according to one embodiment The figures depict various embodiments of the present invention for purposes of illustration only. One skilled in the art will readily recognize from the following discussion that alternative embodiments of the structures and methods illustrated herein may be employed without departing from the principles of the invention described herein.

FIG. 7 is a flowchart illustrating an example process for rendering 360 stereoscopic content, according to one embodiment. The process of FIG. 7 begins when a virtual environment and render camera position are received 710 to be rendered for 360 stereoscopic content. For example, the virtual environment 100 and a desired render camera positions (for example, a desired user head position) can be received at the content rendering module 260 for rendering a 360 stereoscopic eye view using a GPU rendering pipeline. A triangle from the virtual environment is then selected 720 to be shifted. For the triangle, a corresponding viewpoint is then determined 730. In some implementations, an eye vector (such as the eye vector 635) representing the difference between the corresponding viewpoint and the render camera is calculated to determine the viewpoint. Based on the corresponding viewpoint, a shift vector 740 is determined and the triangle is shifted 750 to approximate the view of the triangle from the corresponding viewpoint from the render camera. In some implementations, the GPU rendering pipeline includes a vertex shader into which the steps 730-750 are integrated. An instance of the vertex shader may then be applied to each vertex, performing the steps 730-750 for each vertex of the virtual environment. After all triangles are shifted 760, rendering of the virtual environment continues 770 using the shifted position for each triangle. For example, after the vertex shader including the vertex shift has been applied, the GPU rendering pipeline can continue as normal. Finally, 360 stereoscopic content, such as an eye view for 360 stereoscopic content, can be output 780 based on the virtual environment after the triangles are shifted.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a render request to render a 360 stereoscopic eye view based on a virtual environment, the render request comprising information identifying the virtual environment and a render camera position from which to render the virtual environment;
   for each triangle of a plurality of triangles in the virtual environment:
      determining a corresponding viewpoint for viewing the triangle based on the render camera position and the position of the triangle within the virtual environment;
      determining a shift vector for the triangle based on the corresponding viewpoint; and
      shifting the triangle within the virtual environment based on the shift vector; and
   rendering the virtual environment from the render camera position based on the shifted triangles.

2. The method of claim 1, wherein the corresponding viewpoint is the eye position from which a user's eye would look directly at the triangle.

3. The method of claim 1, wherein determining the shift vector comprises determining a vector that approximates, from the render camera position, the view of the triangle from the corresponding viewpoint.

4. The method of claim 1, wherein for each triangle, the steps of determining a corresponding viewpoint, determining a shift vector, and shifting the triangle are performed by a vertex shader.

5. The method of claim 1, wherein determining the corresponding viewpoint comprises determining an interpupillary distance for viewing the triangle.

6. The method of claim 5, wherein determining an interpupillary distance for viewing the triangle comprises determining the interpupillary distance based on the angle of elevation of the triangle.

7. The method of claim 1, wherein rendering the virtual environment comprises rasterizing the virtual environment based on the shifted triangles of the plurality of triangles and the render camera position.

8. The method of claim 1, wherein rendering the virtual environment further comprises generating a 360 stereoscopic eye view based on the virtual environment.

9. The system of claim 1, wherein the vertex shader is configured to determine the corresponding viewpoint for a triangle by determining an interpupillary distance for viewing the triangle.

10. A non-transitory computer readable medium comprising instructions which, when executed by a processor, cause the processor to perform the steps of:
   receiving a render request to render a 360 stereoscopic eye view based on a virtual environment, the render request comprising information identifying the virtual environment and a render camera position from which to render the virtual environment;
   for each triangle of a plurality of triangles in the virtual environment:
      determining a corresponding viewpoint for viewing the triangle based on the render camera position and the position of the triangle within the virtual environment;
      determining a shift vector for the triangle based on the corresponding viewpoint; and
      shifting the triangle within the virtual environment based on the shift vector; and
   rendering the virtual environment from the render camera position based on the shifted triangles.

11. The non-transitory computer readable medium of claim 10, wherein the corresponding viewpoint is the eye position from which a user's eye would look directly at the triangle.

12. The non-transitory computer readable medium of claim 10, wherein determining the shift vector comprises determining a vector that approximates, from the render camera position, the view of the triangle from the corresponding viewpoint.

13. The non-transitory computer readable medium of claim 10, wherein for each triangle, the steps of determining a corresponding viewpoint, determining a shift vector, and shifting the triangle are performed by a vertex shader.

14. The non-transitory computer readable medium of claim 10, wherein determining the corresponding viewpoint comprises determining an interpupillary distance for viewing the triangle.

15. The non-transitory computer readable medium of claim 14, wherein determining an interpupillary distance for viewing the triangle comprises determining the interpupillary distance based on the angle of elevation of the triangle.

16. The non-transitory computer readable medium of claim 10, wherein rendering the virtual environment comprises rasterizing the virtual environment based on the shifted triangles of the plurality of triangles and the render camera position.

17. The non-transitory computer readable medium of claim 10, wherein rendering the virtual environment further comprises generating a 360 stereoscopic eye view based on the virtual environment.

18. A system comprising:
   an interface module configured to receive a render request to render a 360 stereoscopic eye view based on a virtual environment, the render request comprising information identifying the virtual environment and a render camera position from which to render the virtual environment;
   a vertex shader, the vertex shader configured to, for each triangle of a plurality of triangles in the virtual environment:
      determine a corresponding viewpoint for viewing the triangle based on the render camera position and the position of the triangle within the virtual environment;
      determine a shift vector for the triangle based on the corresponding viewpoint; and
      shift the triangle within the virtual environment based on the shift vector; and
   a rasterizer configured to rasterize the virtual environment from the render camera position based on the shifted triangles.

19. The system of claim 18, wherein the corresponding viewpoint is the eye position from which a user's eye would look directly at the triangle.

20. The system of claim 18, wherein the vertex shader is configured to determine the shift vector for a triangle by determining a vector that approximates, from the render camera position, the view of the triangle from the corresponding viewpoint.

* * * * *

UNITED STATES PATENT AND TRADEMARK OFFICE
CERTIFICATE OF CORRECTION

PATENT NO. : 10,453,247 B1
APPLICATION NO. : 15/945959
DATED : October 22, 2019
INVENTOR(S) : Michael John Toksvig Page 1 of 1

It is certified that error appears in the above-identified patent and that said Letters Patent is hereby corrected as shown below:

On the Title Page

Column 1, (22) Filed, Line 1, After "2018", insert --¶(65) Prior Publication Data US 2019/0311522 A1 Oct. 10, 2019--

Signed and Sealed this
Second Day of June, 2020

Andrei Iancu
*Director of the United States Patent and Trademark Office*